UNITED STATES PATENT OFFICE.

JOHN COLLINS CLANCY, OF NEW YORK, N. Y.

TREATMENT OF PRECIOUS METALLIFEROUS ORES.

976,044. Specification of Letters Patent. Patented Nov. 15, 1910.

No Drawing. Original application filed July 12, 1909, Serial No. 507,110. Divided and this application filed April 25, 1910. Serial No. 557,399.

*To all whom it may concern:*

Be it known that I, JOHN COLLINS CLANCY, a subject of the King of Great Britain, having declared my intention of becoming a citizen of the United States, at present residing at New York city, borough of Manhattan, in the county of New York and State of New York, have invented certain new and useful Improvements in the Treatment of Precious Metalliferous Ores of which the following is a specification.

My invention relates to novel methods of treating ores bearing the precious metals, which methods are particularly described and pointed out in the following specification and claims.

I have discovered that when a substantially non-acid solution of a thiocyanate containing such ore is oxidized the precious metals only will be dissolved to the substantial exclusion of the baser metals. I have also discovered that ozone either alone or in admixture with air may be successfully employed as an agent for producing such oxidation. I have also discovered that said result may be accomplished by ozone with a solution of thiocyanate alone or in connection with cyanid. I have also discovered that this process may be successfully applied to either rebellious or non-rebellious ores without preliminarily roasting even though such ores contain reducing agents or tellurium or both.

I give two following examples of my process without, however, limiting myself to the details of either:—

Example 1: 1000 pounds of pulverized ore are suspended in a solution of one pound potassium thiocyanate, ½ pound caustic lime or caustic soda and ½ pound soluble iodin compound such as potassium iodid, in 2000 pounds of water. 200 grams of ozone are thoroughly mixed with the solution. The ozone liberates the iodin from its compound and the iodin acts on the thiocyanate to produce cyanid. The addition of the iodin compound also insures complete absorption of any excess ozone which might escape without doing oxidation work.

Example 2: 1000 pounds of pulverized ore are suspended in a solution of one pound potassium thiocyanate, ¼ pound potassium cyanid, ½ pound caustic lime or caustic soda, ½ pound soluble iodid compound such as potassium iodid in 2000 pounds water. 200 grams of ozone are thoroughly mixed with the solution. The action is substantially the same as in the last example.

Although I have given a definite quantity of ozone in the above examples, I do not wish to be understood that either this or the other quantities given are invariable. The proper amount of ozone may be determined by titration or otherwise and with some ores as little as 15 grams of ozone to 2000 pounds of solution have given good results.

In each of the above examples, the ozone may be either alone or mixed with air.

In each of the above examples, the desired result is prevented if the solution be substantially acid. Where cyanid is absent, as in the first example, the solution should be alkaline or neutral. Where cyanid is present, as in the second example, the solution may be alkaline, neutral or slightly acid. By slightly acid, I mean this: that while a solution of potassium cyanid may be technically termed "slightly acid" because showing acidity to certain tests, yet for practical purposes it is substantially not acid. Such a solution I call a substantially non-acid solution as well as those which are alkaline or neutral.

The strength of the solution is to some extent dependent upon the character of the ore to be treated and the best strength should therefore be ascertained by preliminary tests, but with ordinary ores the strength that I have given in the foregoing examples answers well. The same solution can be used again and again by keeping up the requisite strength of its constituents.

It is not necessary to preliminarily roast the ore. If reducing agents, such as sulfides or iron are present, they do not act on the solution to decompose it. If tellurium is present, it is dissolved simultaneously with the precious metals.

Having thus described my invention and examples of different ways of carrying it into effect, it will be understood that various modifications and changes in the described processes may be made and equivalent substances may be employed without departing from the spirit of my invention and without exceeding the scope of my claims.

While I have stated above that the process includes the use of a soluble iodin compound I desire it understood that the invention can be carried out by the use of one of the halogen compounds and that iodin is merely referred to by way of example as being the preferred halogen compound to be used in this connection.

This application is a division of my prior application Serial Number 507,110, filed July 12, 1909.

What I claim and desire to secure by Letters Patent of the United States is:—

1. The method of treating ore containing precious metals which consists in subjecting the ore to the action of a thiocyanate and a soluble halogen compound and oxidizing the mixture.

2. The method of treating ore containing precious metals which consists in subjecting the ore to the action of a thiocyanate and a soluble iodin compound and oxidizing the mixture.

3. The method of treating ore containing precious metals which consists in subjecting the ore to the action of a thiocyanate and a soluble halogen compound, and oxidizing said mixture by means of ozone.

4. The method of treating ore containing precious metals which consists in subjecting the said ore to the action of a thiocyanate and a soluble iodin compound, and oxidizing said mixture by means of ozone.

In testimony whereof I have hereunto signed my name in the presence of two subscribing witnesses.

JOHN COLLINS CLANCY.

Witnesses:
M. E. McNINCH,
C. G. HEYLMUR.